(12) United States Patent
Tang et al.

(10) Patent No.: US 11,019,611 B2
(45) Date of Patent: May 25, 2021

(54) METHOD FOR TRANSMITTING CHANNEL, TERMINAL DEVICE AND NETWORK DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 362 days.

(21) Appl. No.: 16/305,524

(22) PCT Filed: Sep. 30, 2016

(86) PCT No.: PCT/CN2016/101178
§ 371 (c)(1),
(2) Date: Nov. 29, 2018

(87) PCT Pub. No.: WO2018/058565
PCT Pub. Date: Apr. 5, 2018

(65) Prior Publication Data
US 2020/0396721 A1    Dec. 17, 2020

(51) Int. Cl.
*H04W 4/00* (2018.01)
*H04W 72/04* (2009.01)
(Continued)

(52) U.S. Cl.
CPC ........ *H04W 72/042* (2013.01); *H04B 7/0413* (2013.01); *H04L 5/0023* (2013.01)

(58) Field of Classification Search
CPC .................. H04W 72/042; H04B 7/0413
See application file for complete search history.

(56) References Cited

U.S. PATENT DOCUMENTS 8,559,374 B2    10/2013   Koo et al.
2013/0242901 A1    9/2013   Kuo
(Continued)

FOREIGN PATENT DOCUMENTS

CN    102355689 A    2/2012
CN    103312391 A    9/2013
(Continued)

OTHER PUBLICATIONS

The first Office Action of the corresponding CN patent application No. 201680087298.1, dated Aug. 13, 2019.
(Continued)

*Primary Examiner* — Minh Trang T Nguyen

(57) ABSTRACT

Disclosed in the embodiments are a method for transmitting a channel, a network device and a terminal device. The method includes: dividing a resource for transmitting a control channel into N resource blocks; and sending, on a first resource block among the N resource blocks, a downlink control channel to a terminal device by using a beam corresponding to the first resource block, the N being a positive integer. According to the method, the network device and the terminal device provided by the embodiment, the downlink control channel can be sent by using the beam and thus the system performance can be enhanced.

14 Claims, 4 Drawing Sheets

(51) Int. Cl.
   *H04B 7/0413*   (2017.01)
   *H04L 5/00*   (2006.01)

(56) References Cited

U.S. PATENT DOCUMENTS

2013/0294366 A1* 11/2013 Papasakellariou ..........................
                                                          H04L 25/0204
                                                                370/329
2016/0028511 A1   1/2016 Papasakellariou et al.
2018/0309495 A1* 10/2018 Xiong ...................... H04J 11/00

FOREIGN PATENT DOCUMENTS

| CN | 104919872 A | 9/2015 |
|---|---|---|
| EP | 2804355 A1 | 11/2014 |
| EP | 2978272 A1 | 1/2016 |

OTHER PUBLICATIONS

The first Office Action of the corresponding TW patent application No. 106128825, dated Jun. 28, 2019.
The second Office Action of the corresponding CN patent application No. 201680087298.1, dated Nov. 13, 2019.
The Communication pursuant to Article 94(3) EPC of the corresponding EP patent application No. 16917315.0, dated Oct. 15, 2020.
The first examination report of the corresponding IN patent application No. 201817046724, dated Nov. 6, 2020.
Extended European Search Report for EP application No. 16917315.0 dated May 22, 2019.
Xinwei: "Considerations on Multi-antenna Schemes for NR Downlink Control Channel Design", 3GPP Draft; R1-166584 Conderations on Multi-Antenna Schemes for NR Control Channel Design 0812SPV2, 3rd Generation Partnership Project (3GPP), Mobile Competence Centre; 650, Route Des Lucioles; F-,vol. RAN WG1, No. Gothenburg, Sweden; Aug. 22, 2016-Aug. 26, 2016 Aug. 21, 2016(Aug. 21, 2016), XP051140290.
NTT DOCOMO et al: "Study on New Radio Access Technology",3GPP Draft; RP-161597 SR_FS_NR_NEWRAT_V3, 3rd Generation Partnership Project(3GPP), Mobile Competence Centre; 650, Route Des Lucioles; f-06921 Sophia-Antipolis Cedex; France, vol. TSG RAN, No. New Orleans, USA; Sep. 19, 2016-Sep. 22, 2016 Sep. 13, 2016(Sep. 13, 2016), XP051661812.
NTT DOCOMO: "Resource Mapping Scheme for E-PDCCH", R1-121477 Mapping for E-PDCCH, 3rd Generation Partnership Project(3GPP), Mobile Competence Centre; 650, Route Des Lucioles; f-06921 Sophia-Antipolis Cedex; France, vol. RAN WG1, No. Jeju, Korea; Mar. 26, 2012-Mar. 30, 2012, Mar. 20, 2012(Mar. 20, 2012), XP050599758.
International Search Report for corresponding application PCT/CN2016/101178 filed on Sep. 30, 2016; dated Mar. 2, 2017.

\* cited by examiner

METHOD FOR TRANSMITTING CHANNEL, TERMINAL DEVICE AND NETWORK DEVICE

TECHNICAL FIELD

The present disclosure relates to the field of communications, and more particularly, to a method for transmitting a channel, a terminal device and a network device.

BACKGROUND

A Multiple-Input Multiple-Output (MIMO) technology is one of core technologies in a Long Term Evolution (LTE) system and can greatly improve the transmission rate of the system. The beamforming is a signal preprocessing technology based on an antenna array; and by adjusting a weight for sending a signal on each antenna array element, a beam with directivity is generated.

Concerning how to send a downlink control channel by using the beam, there hasn't been a referable solution till now.

SUMMARY

In view of this, the embodiments of the present disclosure provide a method for transmitting a channel, a network device and a terminal device, which can send a downlink control channel by using a beam and thus can enhance the system performance.

A first aspect provides a method for transmitting a channel, which may include: a resource for transmitting a control channel is divided into N resource blocks; and on a first resource block among the N resource blocks, a downlink control channel is sent to a terminal device by using a beam corresponding to the first resource block, the N being a positive integer.

The control resource is divided into multiple resource blocks and the downlink control channel may be sent by using the beam corresponding to the resource block, and thus the system performance can be enhanced.

In combination with the first aspect, in a first possible implementation manner of the first aspect, before that on the first resource block among the N resource blocks, the downlink control channel is sent to the terminal device by using the beam corresponding to the first resource block, the method may further include: at least one beam adopted to send the downlink control channel is determined; and according to an identifier of each beam in the at least one beam, a resource block corresponding to the each beam is determined, the resource block including the first resource block.

In combination with the first aspect or any implementation manner of the first aspect, in a second possible implementation manner of the first aspect, before that on the first resource block among the N resource blocks, the downlink control channel is sent to the terminal device by using the beam corresponding to the first resource block, the method may further include: multiple beams adopted to send the downlink control channel are determined; and according to a public beam identifier, the first resource block corresponding to the multiple beams is determined, the public beam identifier being generated based on an identifier of each beam in the multiple beams or being configured for the multiple beams by a network device; and that on the first resource block among the N resource blocks, the downlink control channel is sent to the terminal device by using the beam corresponding to the first resource block includes: on the first resource block, a specific downlink control channel of the terminal device and/or a public downlink control channel are/is sent to the terminal device by using at least one beam in the multiple beams.

In at least one alternative embodiment, after the first resource block is determined according to the public beam identifier, multiple beams corresponding to the first resource block are selected to send the downlink control channel to the terminal device; and in this way, the better beam gain can be obtained.

In at least one alternative embodiment, a beam for transmitting the downlink control channel may be selected according to the identifier of the first resource block.

In combination with the first aspect or any implementation manner of the first aspect, in a third possible implementation manner of the first aspect, that the resource for transmitting the control channel is divided into the N resource blocks may include: the resource for transmitting the control channel is divided into the N resource blocks according to at least one of: a number of beams in a cell, a load capacity in each beam, a number of terminal devices under a coverage of each beam, a transmission rate of a network device, a downlink data volume and control channel transmission quality.

In combination with the first aspect or any implementation manner of the first aspect, in a fourth possible implementation manner of the first aspect, the method may further include: a high-level signal is sent to the terminal device, the high-level signal being configured for notifying the terminal device of receiving the downlink control channel on the first resource block, and/or being configured for notifying the terminal device of a corresponding relationship between the N resource blocks and beam identifiers.

In combination with the first aspect or any implementation manner of the first aspect, in a fifth possible implementation manner of the first aspect, a scrambling code of the downlink control channel and/or a Demodulation Reference Signal (DMRS) sequence are/is generated based on at least one of the following identifiers: an identifier of the first resource block, a beam identifier corresponding to the first resource block and an identifier of a cell where the terminal device is located, the DMRS sequence configured for demodulating the downlink control channel.

In combination with the first aspect or any implementation manner of the first aspect, in a sixth possible implementation manner of the first aspect, the downlink control channel may be transmitted by adopting at least one of the following manners: Space Frequency Block Code (SFBC), SFBC+Frequency Switch Transmit Diversity (SFTD), precoding and beamforming.

A second aspect provides a method for transmitting a channel, which may include: according to a beam received by a terminal device, a first resource block corresponding to the beam is determined; and a downlink control channel sent by a network device is received on the first resource block.

The downlink control channel is received by using the resource block corresponding to the beam and thus the system performance can be enhanced.

The block of receiving the beam by the terminal device refers to that before the network device sends the downlink control channel, a reference signal, a pilot signal and the like are sent to the terminal device by using a beam and thus the terminal device obtains the beam sent by the network device and configured for sending the downlink control channel.

In combination with the second aspect, in a first possible implementation manner of the second aspect, that according to the beam received by the terminal device, the first resource block corresponding to the beam is determined includes: according to a public beam identifier, the first resource block corresponding to received multiple beams is determined, the public beam identifier being generated based on an identifier of each beam in the multiple beams or being configured for the multiple beams by the network device; and that on the first resource block, the downlink control channel sent by the network device is received includes: on the first resource block, a public downlink control channel sent by the network device and/or a specific downlink control channel of the terminal device are/is received.

In combination with the second aspect or any implementation manner of the second aspect, in a second possible implementation manner of the first aspect, that according to a beam received by a terminal device, a first resource block corresponding to the beam is determined includes: the first resource block is determined according to the beam received by the terminal device as well as a pre-stored corresponding relationship between a resource block and a beam identifier.

A third aspect provides a network device, which is configured to execute the method in the first aspect or any possible implementation manner of the first aspect. In at least one alternative embodiment, the network device includes an element configured to execute the method in the first aspect or any possible implementation manner of the first aspect.

A fourth aspect provides a terminal device, which is configured to execute the method in the second aspect or any possible implementation manner of the second aspect. In at least one alternative embodiment, the terminal device includes an element configured to execute the method in the second aspect or any possible implementation manner of the second aspect.

A fifth aspect provides a network device, which may include a memory, a processor, a transceiver, a communication interface and a bus system. Herein, the memory, the processor and the transceiver are connected via the bus system; the memory is configured to store an instruction; the processor is configured to execute the instruction stored by the memory; and when the instruction is executed, the processor executes the method in the first aspect, and controls the transceiver to receive input data and information and output data such as an operation result.

A sixth aspect provides a terminal device, which may include a memory, a processor, a transceiver, a communication interface and a bus system. Herein, the memory, the processor and the transceiver are connected via the bus system; the memory is configured to store an instruction; the processor is configured to execute the instruction stored by the memory; and when the instruction is executed, the processor executes the method in the second aspect, and controls the transceiver to receive input data and information and output data such as an operation result.

A seventh aspect provides a computer storage medium, which is configured to store a computer software instruction used by the method and includes a program designed for executing the above aspects.

In the present disclosure, the names of the terminal device and the network device are not intended to form limits to the devices in itself. During actual implementation, these devices may appear in other names. As long as a function of each device is similar to the present disclosure, all pertain to the scope of claims of the present disclosure and equivalent technologies thereof.

These aspects or other aspects of the present disclosure will become more readable in the description of the following embodiments.

BRIEF DESCRIPTION OF THE DRAWINGS

In order to describe the technical solutions in the embodiments of the present disclosure more clearly, a simple introduction on the accompanying drawings which are needed in the description of the embodiments is given below. Apparently, the accompanying drawings in the description below are merely some of the embodiments of the present disclosure, based on which other drawings may be obtained by those of ordinary skill in the art without any creative effort.

DETAILED DESCRIPTION OF THE EMBODIMENTS

Figure 1:
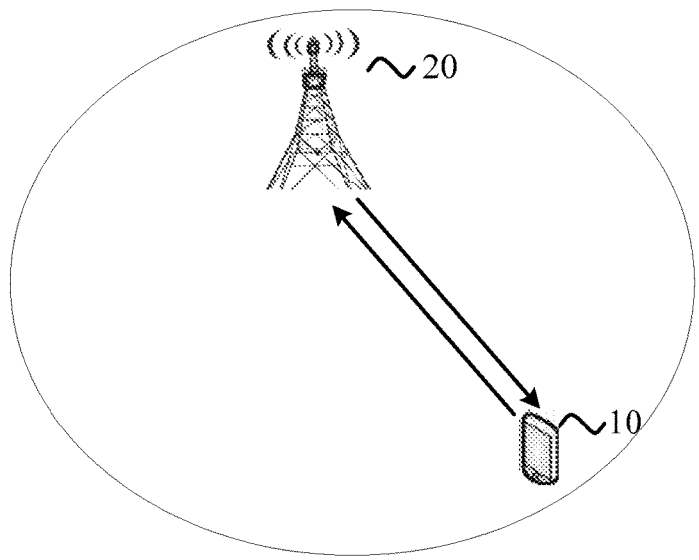
FIG. 1 illustrates a schematic diagram of a possible application scene provided by an embodiment of the present disclosure.

A clear and complete description of the technical solutions in the present disclosure will be given below, in combination with the accompanying drawings in the embodiments of the present disclosure. Apparently, the embodiments described below are a part, but not all, of the embodiments of the present disclosure. All of the other embodiments, obtained by those of ordinary skill in the art based on the embodiments of the present disclosure without any inventive efforts, fall into the protection scope of the present disclosure.

It should be understood that the technical solutions of the present disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system or a future 5G system.

In at least one alternative embodiment, the technical solutions in the embodiments of the present disclosure may be applied to various communication systems based on a non-orthogonal multiple access technology, such as a Sparse Code Multiple Access (SCMA) system and a Low Density Signature (LDS) system. Of course, the SCMA system and the LDS system may also be referred to as other names in the field of communications. Further, the technical solutions in the embodiments of the present disclosure may be applied to multi-carrier transmission systems adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system and a Filtered-OFDM (F-OFDM) system.

The terminal device in the embodiments of the present disclosure may be User Equipment (UE), an access terminal, a user element, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other device connected to a wireless modulator-demodulator, such as processing devices, vehicle-amounted devices and wearable devices, a terminal device in a future 5th-Generation (5G) network or a terminal device in a future evolved Public Land Mobile Network (PLMN), all of which are not limited in the embodiments of the present disclosure.

The network device in the embodiments of the present disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scene; or the network device may be a relay station, an access point, a vehicle-amounted device, a wearable device as well as a network device in the future 5G system or a network device in the future evolved PLMN network, all of which are not limited in the embodiments of the present disclosure.

FIG. 1 is a schematic diagram of an application scene of the present disclosure. The communication system in FIG. 1 may include a terminal device 10 and a network device 20. The network device 20 is configured to provide a communication service for the terminal device 10 to access to a core network. The terminal device 10 access to a network by searching for a synchronization signal, a broadcasting signal and the like sent by the network device 20 and thus performs communication with the network. The arrow shown in FIG. 1 may represent uplink/downlink transmission performed via a cellular link between the terminal device 10 and the network device 20.

Figure 2:
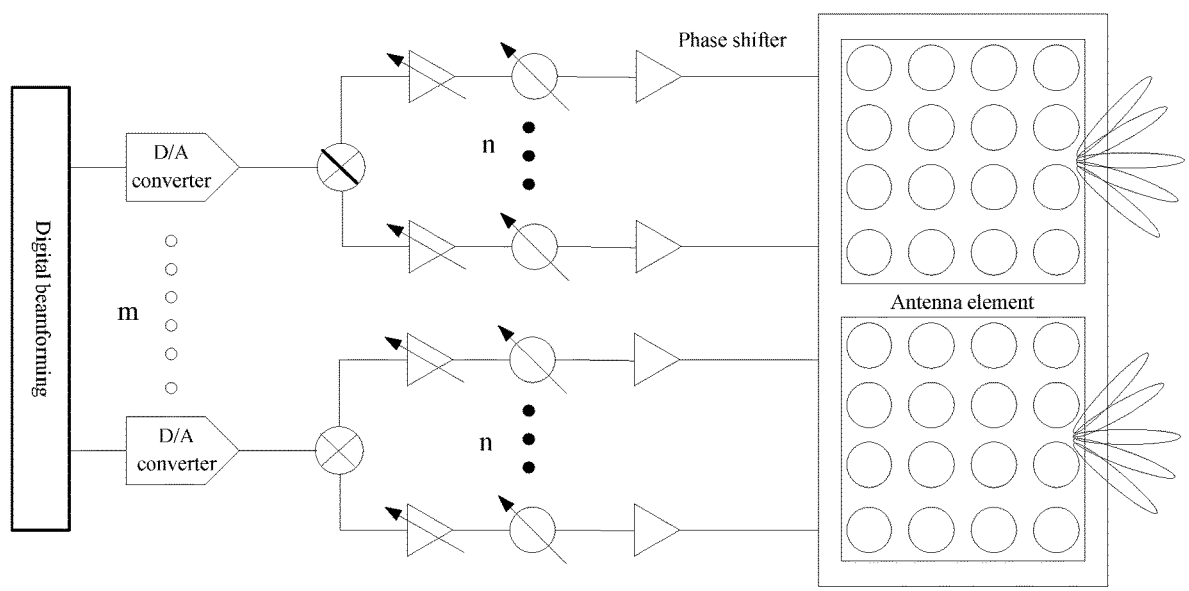
FIG. 2 illustrates a schematic diagram of a possible beamforming.

In a 5G system, data transmission needs to be supported at a high frequency band (the central frequency is 6 GHz or above and is typically, for example, 28 GHz) to meet the requirement of the 5G on the transmission rate. When the data transmission is performed at the high frequency band, in order to achieve a higher transmission rate, there is a need to adopt an MIMO technology. The adoption of the MIMO technology at a high frequency is highly demanding on a radio-frequency device of an antenna, so the hardware (such as A/D and D/A converters) cost of the antenna is greatly increased. In order to lower the cost, a hybrid beamforming manner is employed generally at the high frequency band to reduce the number of radio-frequency receiving and transmitting elements. As shown in FIG. 2, after the digital beamforming, a data signal is formed into a digital transmitting signal of each radio-frequency element and becomes an analog signal via a D/A converter. The analog signal corresponding to each radio-frequency element is formed into an analog beamforming signal via different phase shifters to transmit on different antenna elements, and thus the beamforming in an analog domain is implemented. By adopting the hybrid beamforming method, the number of radio-frequency channels can be reduced and thus the hardware cost is reduced; and meanwhile, the beamforming gain can further be obtained.

Since a antenna array with a great number of antennas is adopted, a narrower beam with better directivity can be generated and such a beam may also be used for transmitting a control signal. Therefore, the embodiments of the present disclosure provide a novel method for transmitting a channel, which can transmit a control channel by using a beam and thus can improve the system performance.

Figure 3:
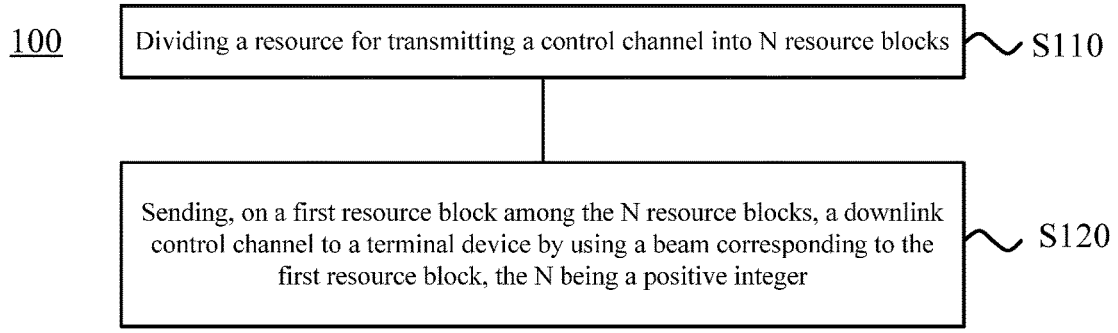
FIG. 3 illustrates a schematic block diagram of a method for transmitting a channel provided by an embodiment of the present disclosure.

FIG. 3 illustrates a schematic block diagram of a method 100 for transmitting a channel provided by an embodiment of the present disclosure. As shown in FIG. 3, the method 100 may be executed by a network device. For example, the method 100 may be executed by a base station. The method 100 may include the following blocks.

At S110, a resource for transmitting a control channel is divided into N resource blocks.

At S120, on a first resource block among the N resource blocks, a downlink control channel is sent to a terminal device by using a beam corresponding to the first resource block, the N being a positive integer.

Figure 4:
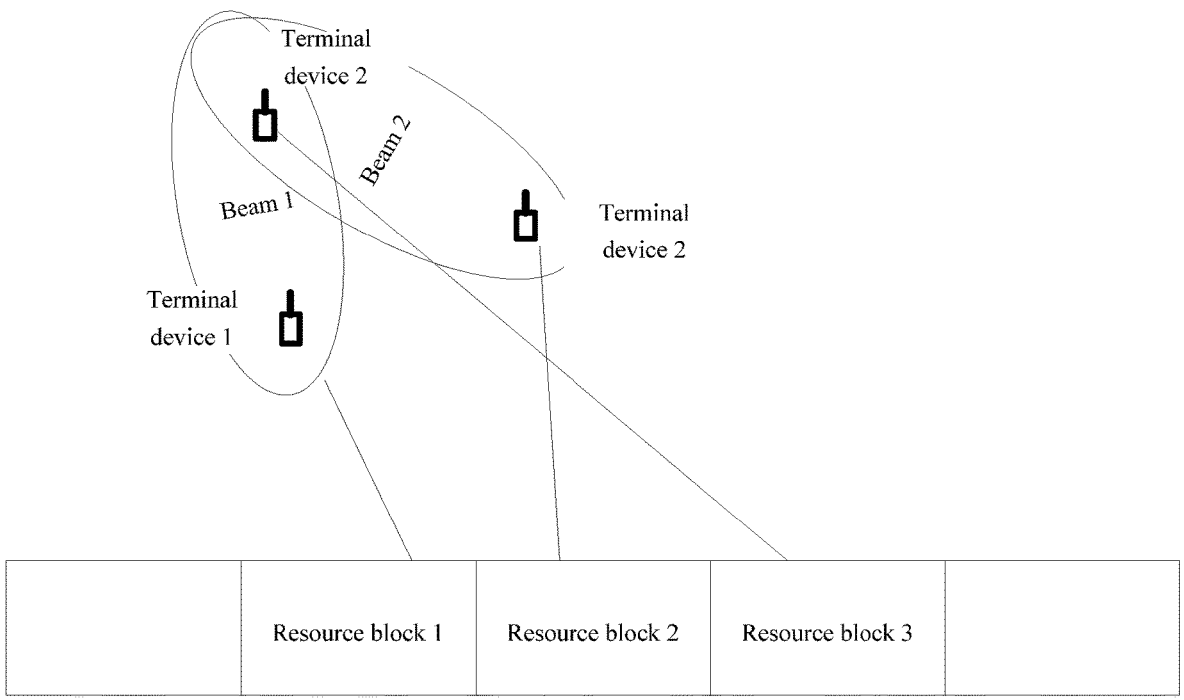
FIG. 4 illustrates an allocation diagram of a resource for transmitting a control channel provided by an embodiment of the present disclosure.

In at least one alternative embodiment, the resource for transmitting the control channel such as a Physical Resource Block (PRB) and a Resource Block Group (RBG) may be divided into several groups. As shown in FIG. 4, each group may be corresponded to at least one beam for transmitting a control channel. For example, the resource block 1 corresponds to the beam 1, the resource block 2 corresponds to the beam 2, and the resource block 3 corresponds to the beam 1 and the beam 2. Further, the network device may send the control channel to the terminal device 1 by using the beam 1 on the resource block 1 when it is assumed that the terminal device 1 is a terminal device under the coverage of the beam 1. The network device may send the control channel to the terminal device 2 by using the beam 2 on the resource 2 when it is assumed that the terminal device 2 is a terminal device under the coverage of the beam 2. The network device may further send the control channel to the terminal device 3 by using the beam 1 and the beam 2 on the resource block 3 and the terminal device 3 is a terminal device at the junction of the beam 1 and the beam 2.

It should be understood that the above merely are a schematic description with FIG. 4 as an example. Each resource block divided may correspond to one beam and may also correspond to multiple beams. In other words, when the resource block corresponds to one beam, the beam may be adopted to transmit the control channel. When the resource block corresponds to multiple beams, at least one beam in the multiple beams may be adopted to transmit the control channel. When the multiple beams are adopted to transmit a downlink control channel, the better beam gain can be obtained.

In at least one alternative embodiment, each resource block is provided with an identifier and the beam corresponding to the resource block is provided with a beam identifier. The identifier of each resource block may correspond to the identifier of the beam and a corresponding relationship may be stored on the network device and/or terminal device. In such as case, the resource block corresponding to the beam identifier may be obtained according to the beam identifier. The beam for transmitting the control channel may also be obtained according to the identifier of the resource block. When one resource block corresponds to multiple beams, a public beam identifier may be determined based on the beam identifiers of the multiple beams; alternatively, one identifier may be provided for the multiple beams, in which the identifier is merely configured for indicating beams to which one resource block therein corresponds; and the public beam identifier is not limited in this embodiment of the present disclosure.

In at least one alternative embodiment, in this embodiment of the present disclosure, that the resource for transmitting the control channel is divided into N resource blocks includes: the resource for transmitting the control channel is divided into the N resource blocks according to at least one of: a number of beams in a cell, a load capacity in each beam, a number of terminal devices under a coverage of each beam, a transmission rate of a network device, a downlink data volume and control channel transmission quality.

In at least one alternative embodiment, in this embodiment of the present disclosure, the method may further include: a high-level signal is sent to the terminal device, the high-level signal being configured for notifying the terminal device of receiving the downlink control channel on the first resource block, and/or being configured for notifying the terminal device of a corresponding relationship between the N resource blocks and beam identifiers.

It should be understood that the network device may further notify the terminal device of the corresponding relationship between the resource blocks and the beam identifiers, so that the terminal device may determine a corresponding relationship between the resource blocks and the beams according to the beam identifiers, or the network device may directly notify the terminal device of the corresponding relationship between the resource blocks and the beams, all of which are not defined in the present disclosure.

In at least one alternative embodiment, in this embodiment of the present disclosure, a scrambling code of the downlink control channel and a DMRS sequence is generated based on at least one identifier of the followings: an identifier of the first resource block, a beam identifier corresponding to the first resource block and an identifier of a cell where the terminal device is located, the DMRS sequence configured for demodulating the downlink control channel. In at least one alternative embodiment, when the first resource block corresponds to one beam, the beam identifier corresponding to the first resource block is the identifier of that one beam; and when the first resource block corresponds to multiple beams, the beam identifier corresponding to the first resource block is a public beam identifier generated based on the multiple beams or a public beam identifier configured by the network device.

In at least one alternative embodiment, in this embodiment of the present disclosure, the downlink control channel may be transmitted by adopting at least one manner of the followings: SFBC, SFBC+SFTD, precoding and beamforming.

It should be understood that the control channel may be a specific control channel of the terminal device and may be, for example, a scheduling channel on the terminal device. The above control channel may further be a public control channel, and the present disclosure is not limited to this.

Figure 5:
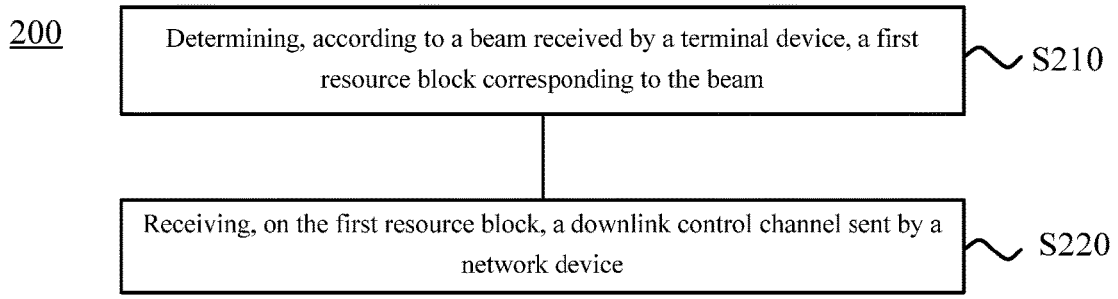
FIG. 5 illustrates another schematic block diagram of a method for transmitting a channel provided by an embodiment of the present disclosure.

FIG. 5 illustrates another schematic block diagram of a method 200 for transmitting a channel provided by an embodiment of the present disclosure. As shown in FIG. 5, the method 200 may be executed by a terminal device, for example, the method 200 may be executed by a UE. The method 200 may include the following blocks.

At S210, according to a beam received by a terminal device, a first resource block corresponding to the beam is determined.

At S220, a downlink control channel sent by a network device is received on the first resource block.

Therefore, according to the method for transmitting the channel provided by this embodiment of the present disclosure, the downlink control channel is received by using the resource block corresponding to the beam and thus the system performance can be enhanced.

It should be understood that the block of receiving the beam by the terminal device refers to that before the network device sends the downlink control channel, a reference signal, a pilot signal and the like are sent to the terminal device by using the beam and thus the terminal device obtains the beam sent by the network device and configured for sending the downlink control channel.

In at least one alternative embodiment, in this embodiment of the present disclosure, that according to the beam received by the terminal device, the first resource block corresponding to the beam is determined includes: according to a public beam identifier, the first resource block corresponding to received multiple beams is determined, the public beam identifier being generated based on an identifier of each beam in the multiple beams or being configured for the multiple beams by the network device; and that on the first resource block, the downlink control channel sent by the network device is received includes: on the first resource block, a public downlink control channel sent by the network device and/or a specific downlink control channel of the terminal device are/is received.

In at least one alternative embodiment, in this embodiment of the present disclosure, that according to the beam received by the terminal device, the first resource block corresponding to the beam is determined includes: the first resource block is determined according to the beam received by the terminal device as well as a pre-stored corresponding relationship between resource blocks and beam identifiers.

It should be understood that the terminal device may determine, according to the received beams, the beam identifier of each beam or the public beam identifier of multiple beams, and thus the terminal device may determine the resource block corresponding to the beam identifier according to the beam identifier.

It should be understood that the interaction between the terminal device and the network device and relevant characteristics, functions and the like described at the terminal device side correspond to the relevant characteristics, functions and the like at the network device side and will not be repeated herein for the briefness.

It should further be understood that, in each embodiment of the present disclosure, sequence numbers of the foregoing processes do not mean execution sequences. The execution sequences of the processes should be determined according to functions and internal logic of the processes, and should not be construed as any limitation on the implementation processes of the embodiments of the present disclosure.

The method for transmitting the channel according to the embodiments of the present disclosure is described above in detail. Hereinafter, the device for transmitting the channel according to the embodiments of the present disclosure will be described in detail in combination with FIG. 6 to FIG. 9, and the technical characteristics described in the method embodiments may be applied to the following device embodiments.

Figure 6:
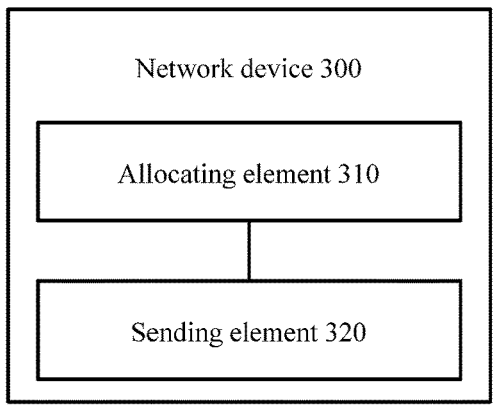
FIG. 6 illustrates a schematic block diagram of a network device for transmitting a signal provided by an embodiment of the present disclosure.

FIG. 6 illustrates a schematic block diagram of a network device 300 for transmitting a signal provided by an embodiment of the present disclosure. As shown in FIG. 6, the network device 300 may include an allocating element 310 and a sending element.

The allocating element 310 is configured to divide a resource for transmitting a control channel into N resource blocks.

The sending element is configured to send, on a first resource block among the N resource blocks, a downlink control channel to a terminal device by using a beam corresponding to the first resource block, the N being a positive integer Therefore, according to the network device for transmitting the channel provided by this embodiment of the present disclosure, the control resource is divided into multiple resource blocks and the downlink control channel may be sent by using the beam corresponding to the resource block, and thus the system performance can be enhanced.

In at least one alternative embodiment, in this embodiment of the present disclosure, the network device 300 may further include a first determining element and a second determining element.

The first determining element is configured to determine at least one beam adopted to send the downlink control channel.

The second determining element is configured to determine, according to an identifier of each beam in the at least one beam, a resource block corresponding to the each beam, the resource block including the first resource block.

In at least one alternative embodiment, in this embodiment of the present disclosure, the first determining element is further configured to: determine multiple beams adopted to send the downlink control channel; the second determining element is further configured to: determine, according to a public beam identifier, the first resource block corresponding to the multiple beams, the public beam identifier being generated based on an identifier of each beam in the multiple beams or being configured for the multiple beams by a network device; and the sending element is configured to: send, on the first resource block, a specific downlink control channel of the terminal device and/or a public downlink control channel to the terminal device by using the at least one beam in the multiple beams.

In at least one alternative embodiment, in this embodiment of the present disclosure, the allocating element is configured to: divide the resource for transmitting the control channel into the N resource blocks according to at least one of: a number of beams in a cell, a load capacity in each beam, a number of terminal devices under a coverage of each beam, a transmission rate of a network device, a downlink data volume and control channel transmission quality.

In at least one alternative embodiment, in this embodiment of the present disclosure, the sending element is further configured to: send a high-level signal to the terminal device, the high-level signal being configured for notifying the terminal device of receiving the downlink control channel on the first resource block, and/or being configured for notifying the terminal device of a corresponding relationship between the N resource blocks and beam identifiers.

In at least one alternative embodiment, in this embodiment of the present disclosure, a scrambling code of the downlink control channel and/or a DMRS sequence is generated based on at least one identifier of the followings: an identifier of the first resource block, a beam identifier corresponding to the first resource block and an identifier of a cell where the terminal device is located, the DMRS sequence configured for demodulating the downlink control channel.

In at least one alternative embodiment, in this embodiment of the present disclosure, the downlink control channel may be transmitted by adopting at least one manner of the followings: SFBC, SFBC+SFTD, precoding and beamforming.

It should be understood that the network device 300 for transmitting the channel according to the embodiments of the present disclosure may correspond to the network device in the embodiments of the present disclosure. Furthermore, the above and other operations and/or functions of each element in the network device 300 are intended to implement a corresponding process of the method in FIG. 3 and will not be repeated for the briefness.

Figure 7:
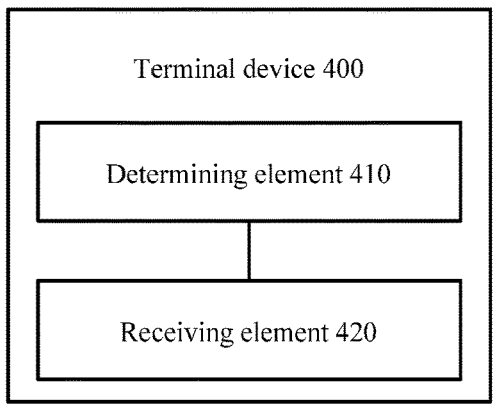
FIG. 7 illustrates a schematic block diagram of a terminal device for transmitting a signal provided by an embodiment of the present disclosure.

FIG. 7 illustrates a terminal device 400 for transmitting a channel provided by an embodiment of the present disclosure. As shown in FIG. 7, the terminal device 400 may include a determining element and a receiving element.

The determining element is configured to determine, according to a beam received by a terminal device, a first resource block corresponding to the beam.

The receiving element is configured to receive, on the first resource block, a downlink control channel sent by a network device.

Therefore, according to the terminal device for transmitting the channel provided by this embodiment of the present disclosure, the downlink control channel is received by using the resource block corresponding to the beam and thus the system performance can be enhanced.

The block of receiving the beam by the terminal device refers to that before the network device sends the downlink control channel, a reference signal, a pilot signal and the like are sent to the terminal device by using the beam and thus the terminal device obtains the beam sent by the network device and used for sending the downlink control channel.

In at least one alternative embodiment, in this embodiment of the present disclosure, the determining element is configured to: determine, according to a public beam identifier, a first resource block corresponding to received multiple beams, the public beam identifier being generated based on an identifier of each beam in the multiple beams or being configured for the multiple beams by the network device, wherein the receiving element is configured to receive, on the first resource block, a public downlink control channel sent by the network device and/or a specific downlink control channel of the terminal device.

In at least one alternative embodiment, in this embodiment of the present disclosure, the determining element is configured to: determine the first resource block according to the beam received by the terminal device as well as a pre-stored corresponding relationship between resource blocks and beam identifiers.

It should be understood that the terminal device 400 for transmitting the channel according to the embodiments of the present disclosure may correspond to the terminal device in the embodiments of the present disclosure. Furthermore, the above and other operations and/or functions of each element in the terminal device 400 are intended to implement a corresponding process of the method in FIG. 5 and will not be repeated for the briefness.

Figure 8:
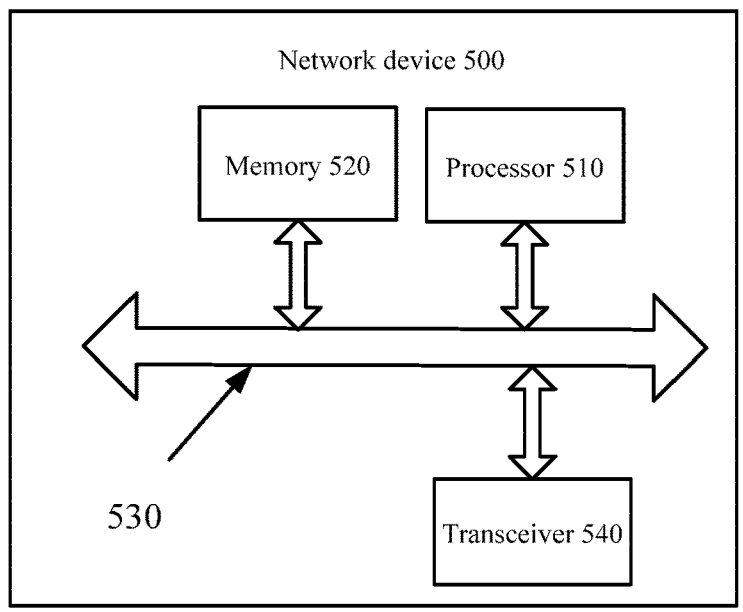
FIG. 8 illustrates another schematic block diagram of a network device for transmitting a signal provided by an embodiment of the present disclosure.

As shown in FIG. 8, an embodiment of the present disclosure further provides a network device 500 for transmitting a channel, which may include a processor 510, a memory 520, a bus system 530 and a transceiver 540; the processor 510, the memory 520 and the transceiver 540 are connected via the bus system 530; the memory 520 is configured to store an instruction; the processor 510 is configured to execute the instruction stored by the memory 520 so as to control the transceiver 540 to send a signal; and the processor 510 is configured to: divide a resource for transmitting a control channel into N resource blocks; and send, on a first resource block among the N resource blocks, a downlink control channel to a terminal device by using a beam corresponding to the first resource block, the N being a positive integer.

Therefore, according to the network device for transmitting the channel provided by this embodiment of the present disclosure, the control resource is divided into multiple resource blocks and the downlink control channel may be sent by using the beam corresponding to the resource block, and thus the system performance can be enhanced.

It should be understood that, in this embodiment of the present disclosure, the processor 510 may be a Central Processing Unit (CPU). The processor 510 may further be other universal processors, a Digital Signal Processor (DSP), an Application Specific Integrated Circuit (ASIC), a Field Programmable Gate Array (FPGA) or other programmable logic devices, separate gates or transistor logic devices and separate hardware components, etc. The universal processors may be a microprocessor or the processor may also be any conventional processor, etc.

The memory 520 may include a Read-Only Memory (ROM) and a Random-Access Memory (RAM) and provides instructions and data for the processor 10. A part of the processor 520 may further include a nonvolatile random access memory. For example, the processor 520 may further store information on a type of a storage device.

Beside a data bus, the bus system 530 may further include a power bus, a control bus and a state signal bus, etc. For clarity of description, various buses in the figure all are marked as the bus system 530.

In an implementation process, the blocks in the foregoing methods may be completed using an integrated logic circuit of hardware in the processor 510 or an instruction in a form of software. The method for transmitting the signal disclosed in combination with the embodiments of the present disclosure may be directly executed and accomplished by means of a hardware processor or may be executed and accomplished using a combination of hardware and software components in the processor. The software component may be located in a mature storage medium in the art, such as a RAM, a flash memory, a ROM, a programmable ROM (PROM), an electrically erasable PROM (EEPROM) or a register. The storage medium is located in the memory 520. The processor 510 reads information from the memory 520 and completes the blocks of the foregoing methods in combination with the hardware. To avoid repetition, details are not described herein again.

In at least one alternative embodiment, in this embodiment of the present disclosure, the processor 510 is further configured to: determine at least one beam adopted to send the downlink control channel; and determine, according to an identifier of each beam in the at least one beam, a resource block corresponding to the each beam, the resource block including the first resource block.

In at least one alternative embodiment, in this embodiment of the present disclosure, the processor 510 is configured to: determine multiple beams adopted to send the downlink control channel; determine, according to a public beam identifier, the first resource block corresponding to the multiple beams, the public beam identifier being generated based on an identifier of each beam in the multiple beams or being configured for the multiple beams by a network device; and send, on the first resource block, a specific downlink control channel of the terminal device and/or a public downlink control channel to the terminal device by using the at least one beam in the multiple beams.

In at least one alternative embodiment, in this embodiment of the present disclosure, the processor 510 is configured to: divide the resource for transmitting the control channel into the N resource blocks according to at least one of: a number of beams in a cell, a load capacity in each beam, a number of terminal devices under a coverage of each beam, a transmission rate of a network device, a downlink data volume and control channel transmission quality.

In at least one alternative embodiment, in this embodiment of the present disclosure, the processor 510 is configured to: send a high-level signal to the terminal device, the high-level signal being configured for notifying the terminal device of receiving the downlink control channel on the first resource block, and/or being configured for notifying the terminal device of a corresponding relationship between the N resource blocks and beam identifiers.

In at least one alternative embodiment, in this embodiment of the present disclosure, a scrambling code of the downlink control channel and/or a DMRS sequence is generated based on at least one identifier of the followings: an identifier of the first resource block, a beam identifier corresponding to the first resource block and an identifier of a cell where the terminal device is located, the DMRS sequence configured for demodulating the downlink control channel.

In at least one alternative embodiment, in this embodiment of the present disclosure, the downlink control channel may be transmitted by adopting at least one manner of the followings: SFBC, SFBC+SFTD, precoding and beamforming.

It should be understood that the network device 500 for transmitting the channel according to the embodiments of the present disclosure may correspond to the network device in the embodiments of the present disclosure and may correspond to the network device for executing the method in the embodiments of the present disclosure. Furthermore, the above and other operations and/or functions of each element in the network device 500 are intended to implement a corresponding process of the method in FIG. 3 and will not be repeated for the briefness.

Figure 9:
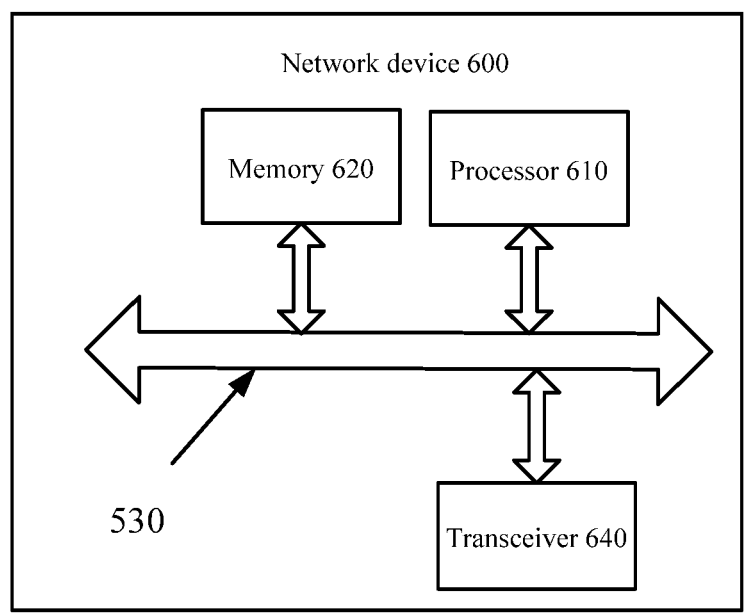
FIG. 9 illustrates another schematic block diagram of a terminal device for transmitting a signal provided by an embodiment of the present disclosure.

As shown in FIG. 9, an embodiment of the present disclosure further provides a terminal device 600 for transmitting a channel, which may include a processor 610, a memory 620, a bus system 630 and a transceiver 640; the processor 610, the memory 620 and the transceiver 640 are connected via the bus system 630; the memory 620 is configured to store an instruction; the processor 610 is configured to execute the instruction stored by the memory 620 so as to control the transceiver 640 to send a signal; and the processor 610 is configured to: determine, according to a beam received by the terminal device, a first resource block corresponding to the beam; and receive, on the first resource block, a downlink control channel sent by a network device.

Therefore, according to the terminal device for transmitting the channel provided by this embodiment of the present disclosure, the downlink control channel is received by using the resource block corresponding to the beam and thus the system performance can be enhanced.

It should be understood that, in this embodiment of the present disclosure, the processor 610 may be a Central Processing Unit (CPU). The processor 610 may further be other universal processors, a Digital Signal Processor (DSP), an Application Specific Integrated Circuit (ASIC), a Field Programmable Gate Array (FPGA) or other programmable logic devices, separate gates or transistor logic devices and separate hardware components, etc. The universal processors may be a microprocessor or the processor may also be any conventional processor, etc.

The memory 620 may include a Read-Only Memory (ROM) and a Random-Access Memory (RAM) and provides instructions and data for the processor 10. A part of the processor 620 may further include a nonvolatile random access memory. For example, the processor 620 may further store information on a type of a storage device.

Beside a data bus, the bus system 630 may further include a power bus, a control bus and a state signal bus, etc. For clarity of description, various buses in the figure all are marked as the bus system 630.

In an implementation process, the blocks in the foregoing methods may be completed using an integrated logic circuit of hardware in the processor 610 or an instruction in a form of software. The method for transmitting the signal disclosed in combination with the embodiments of the present disclosure may be directly executed and accomplished by means of a hardware processor or may be executed and accomplished using a combination of hardware and software components in the processor. The software component may be located in a mature storage medium in the art, such as a RAM, a flash memory, a ROM, a programmable ROM (PROM), an electrically erasable PROM (EEPROM) or a register. The storage medium is located in the memory 620. The processor 610 reads information from the memory 620 and completes the blocks of the foregoing methods in combination with the hardware. To avoid repetition, details are not described herein again.

In at least one alternative embodiment, in this embodiment of the present disclosure, the processor 610 is configured to: determine, according to a public beam identifier, the first resource block corresponding to received multiple beams, the public beam identifier being generated based on an identifier of each beam in the multiple beams or being configured for the multiple beams by the network device; and that on the first resource block, the downlink control channel sent by the network device is received includes: on the first resource block, a public downlink control channel sent by the network device and/or a specific downlink control channel of the terminal device is received.

In at least one alternative embodiment, in this embodiment of the present disclosure, the processor 610 is configured to: determine the first resource block according to the beam received by the terminal device as well as a pre-stored corresponding relationship between resource blocks and beam identifiers.

It should be understood that the terminal device 600 for transmitting the channel according to this embodiment of the present disclosure may correspond to the terminal device and terminal device 600 in the embodiments of the present disclosure and may correspond to the terminal device for executing the method in the embodiments of the present disclosure. Furthermore, the above and other operations and/or functions of each element in the terminal device 600 are intended to implement a corresponding process of the method in FIG. 5 and will not be repeated for the briefness.

It should be understood that operations and/or functions of each element in the terminal device provided by this embodiment of the present disclosure respectively correspond to the terminal device in the method side; and interaction with the network device and relevant characteristics, functions and the like correspond to the relevant characteristics, the functions and the like of the network device side and will not be repeated herein for the briefness.

It should be understood that, in this embodiment of the present disclosure, "B corresponding to A" represents that the B is associated with the A and the B may be determined according to the A. However, it should further be understood that the B is determined according to the A, which does not mean the B is determined merely according to the A and the B may further be determined according to the A and/or other information.

A person of ordinary skill in the art may be aware that, in combination with the examples described in the embodiments disclosed in this specification, elements and algorithm blocks may be implemented by an electronic hardware, a computer software or a combination of the computer software and the electronic hardware. In order to clear the interchangeability between the hardware or the software, the combination and the block in the embodiments are generally described according to the functions in the above specification. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and element, reference may be made to a corresponding process in the foregoing method embodiments, and details are not described herein again.

In the several embodiments provided in the present application, it should be understood that the disclosed system, devices, and method may be implemented in other manners. For example, the described devices embodiment is merely exemplary. For example, the element division is merely logical function division and may be other division in actual implementation. For example, a plurality of elements or components may be combined or integrated into another system. In addition, each function element in the embodiment of the present disclosure may be integrated into one processing element, may be respectively present each other, and may integrated two or more elements into one element. The above intergrated element may be implemented by using a form of the hardware, also may be implemented by using a form of software function element.

When the integrated elements are implemented in the form of a software functional element and sold or used as an independent product, the integrated elements may be stored in a computer-readable storage medium. Based on such an understanding, the technical solutions of the present disclosure is or is essentially a part contributing to the prior art, and all or some of the technical solutions may be implemented in a form of a software product. The software product is stored in a storage medium and includes several instructions for instructing a computer device (which may be a personal computer, a server, or a network device) to perform all or some of the blocks of the methods described in the embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely implementation manners of the present disclosure but are not intended to limit the protection scope of the present disclosure. Within the technical scope disclosed in the present disclosure, any person skilled in the art may easily obtain any equivalent variation or replacement.

What is claimed is:

1. A method for transmitting a channel, comprising:
    dividing a resource for transmitting a control channel into N resource blocks; and
    sending, on a first resource block among the N resource blocks, a downlink control channel to a terminal device by using a beam corresponding to the first resource block, the N being a positive integer;
    wherein before sending, on the first resource block among the N resource blocks, the downlink control channel to the terminal device by using the beam corresponding to the first resource block, further comprising:
    determining multiple beams adopted to send the downlink control channel; and
    determining, according to a public beam identifier, the first resource block corresponding to the multiple beams, the public beam identifier being generated based on an identifier of each beam in the multiple beams or being configured for the multiple beams by a network device; and
    sending, on the first resource block among the N resource blocks, the downlink control channel to the terminal device by using the beam corresponding to the first resource block comprises:
    sending, on the first resource block, a specific downlink control channel of the terminal device and/or a public downlink control channel to the terminal device by using the multiple beams;
    wherein a scrambling code of the downlink control channel and/or a Demodulation Reference Signal (DMRS) sequence are/is generated based on at least one of the following identifiers: an identifier of the first resource block, and a beam identifier corresponding to the first resource block, the DMRS sequence being configured for demodulating the downlink control channel.

2. The method as claimed in claim 1, before sending, on the first resource block among the N resource blocks, the downlink control channel to the terminal device by using the beam corresponding to the first resource block, further comprising:
    determining at least one beam adopted to send the downlink control channel; and
    determining, according to an identifier of each beam in the at least one beam, a resource block corresponding to the each beam, the resource block comprising the first resource block.

3. The method as claimed in claim 1, wherein dividing the resource for transmitting the control channel into the N resource blocks comprises:
    dividing the resource for transmitting the control channel into the N resource blocks according to at least one of: a number of beams in a cell, a load capacity in each beam, a number of terminal devices under a coverage of each beam, a transmission rate of a network device, a downlink data volume and control channel transmission quality.

4. The method as claimed in claim 1, further comprising:
    sending a high-level signal to the terminal device, the high-level signal being configured for notifying the terminal device of receiving the downlink control channel on the first resource block, and/or being configured for notifying the terminal device of a corresponding relationship between the N resource blocks and beam identifiers.

5. The method as claimed in claim 1, wherein the downlink control channel is transmitted by adopting at least one of the following manners: Space Frequency Block Code (SFBC), SFBC +Frequency Switch Transmit Diversity (SFTD), precoding and beamforming.

6. A method for transmitting a channel, comprising:
    determining, according to a beam received by a terminal device, a first resource block corresponding to the beam; and
    receiving, on the first resource block, a downlink control channel sent by a network device;
    wherein determining, according to the beam received by the terminal device, the first resource block corresponding to the beam comprises:
    determining, according to a public beam identifier, the first resource block corresponding to received multiple beams, the public beam identifier being generated based on an identifier of each beam in the multiple beams or being configured for the multiple beams by the network device; and
    receiving, on the first resource block, the downlink control channel sent by the network device comprises:
    receiving, on the first resource block, a public downlink control channel sent by the network device and/or a specific downlink control channel of the terminal device;
    wherein a scrambling code of the downlink control channel and/or a Demodulation Reference Signal (DMRS) sequence are/is generated based on at least one of the following identifiers: an identifier of the first resource block, a beam identifier corresponding to the first resource block, the DMRS sequence being configured for demodulating the downlink control channel.

7. The method as claimed in claim 6, wherein determining, according to the beam received by the terminal device, the first resource block corresponding to the beam comprises:
    determining the first resource block according to the beam received by the terminal device as well as a pre-stored corresponding relationship between a resource block and a beam identifier.

8. A network device for transmitting a channel, comprising:
    at least one processor; and
    a computer readable storage, coupled to the at least one processor and storing at least one computer executable instructions thereon, which when the at least one computer executable instructions is executed by the at least one processor, cause the at least one processor to carry out following actions:
    dividing a resource for transmitting a control channel into N resource blocks; and
    sending, on a first resource block among the N resource blocks, a downlink control channel to a terminal device by using a beam corresponding to the first resource block, the N being a positive integer;

wherein before sending, on the first resource block among the N resource blocks, the downlink control channel to the terminal device by using the beam corresponding to the first resource block, further comprising:
- determining multiple beams adopted to send the downlink control channel; and
- determining, according to a public beam identifier, the first resource block corresponding to the multiple beams, the public beam identifier being generated based on an identifier of each beam in the multiple beams or being configured for the multiple beams by a network device; and
- sending, on the first resource block among the N resource blocks, the downlink control channel to the terminal device by using the beam corresponding to the first resource block comprises:
- sending, on the first resource block, a specific downlink control channel of the terminal device and/or a public downlink control channel to the terminal device by using the multiple beams;
- wherein a scrambling code of the downlink control channel and/or a Demodulation Reference Signal (DMRS) sequence are/is generated based on at least one of the following identifiers: an identifier of the first resource block, and a beam identifier corresponding to the first resource block, the DMRS sequence being configured for demodulating the downlink control channel.

9. The network device as claimed in claim 8, before sending, on the first resource block among the N resource blocks, the downlink control channel to the terminal device by using the beam corresponding to the first resource block, further comprising:
- determining at least one beam adopted to send the downlink control channel; and
- determining, according to an identifier of each beam in the at least one beam, a resource block corresponding to the each beam, the resource block comprising the first resource block.

10. The network device as claimed in claim 8, wherein dividing the resource for transmitting the control channel into the N resource blocks comprises:
- dividing the resource for transmitting the control channel into the N resource blocks according to at least one of: a number of beams in a cell, a load capacity in each beam, a number of terminal devices under a coverage of each beam, a transmission rate of a network device, a downlink data volume and control channel transmission quality.

11. The network device as claimed in claim 8, further comprising:
- sending a high-level signal to the terminal device, the high-level signal being configured for notifying the terminal device of receiving the downlink control channel on the first resource block, and/or being configured for notifying the terminal device of a corresponding relationship between the N resource blocks and beam identifiers.

12. The network device as claimed in claim 8, wherein the downlink control channel is transmitted by adopting at least one of the following manners: Space Frequency Block Code (SFBC), SFBC +Frequency Switch Transmit Diversity (SFTD), precoding and beamforming.

13. A terminal device for transmitting a channel, comprising:
- at least one processor; and
- a computer readable storage, coupled to the at least one processor and storing at least one computer executable instructions thereon, which when the at least one computer executable instructions is executed by the at least one processor, cause the at least one processor to carry out following actions:
- determining, according to a beam received by a terminal device, a first resource block corresponding to the beam; and
- receiving, on the first resource block, a downlink control channel sent by a network device;
- wherein determining, according to the beam received by the terminal device, the first resource block corresponding to the beam comprises:
- determining, according to a public beam identifier, the first resource block corresponding to received multiple beams, the public beam identifier being generated based on an identifier of each beam in the multiple beams or being configured for the multiple beams by the network device; and
- receiving, on the first resource block, the downlink control channel sent by the network device comprises:
- receiving, on the first resource block, a public downlink control channel sent by the network device and/or a specific downlink control channel of the terminal device;
- wherein a scrambling code of the downlink control channel and/or a Demodulation Reference Signal (DMRS) sequence are/is generated based on at least one of the following identifiers: an identifier of the first resource block, and a beam identifier corresponding to the first resource block, the DMRS sequence being configured for demodulating the downlink control channel.

14. The terminal device as claimed in claim 13, wherein determining, according to the beam received by the terminal device, the first resource block corresponding to the beam comprises:
- determining the first resource block according to the beam received by the terminal device as well as a pre-stored corresponding relationship between a resource block and a beam identifier.

* * * * *